United States Patent
Pruneda (10) Patent No.: US 10,246,050 B2
(45) Date of Patent: Apr. 2, 2019

(54) RETRACTOR AND SEAT BELT DEVICE

(71) Applicant: JOYSON SAFETY SYSTEMS JAPAN K.K., Tokyo (JP)

(72) Inventor: Miguel Pruneda, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 174 days.

(21) Appl. No.: 15/472,171

(22) Filed: Mar. 28, 2017

(65) Prior Publication Data

US 2017/0282852 A1 Oct. 5, 2017

(30) Foreign Application Priority Data

Mar. 29, 2016 (JP) .................................. 2016-066862

(51) Int. Cl.
*B60R 22/38* (2006.01)

(52) U.S. Cl.
CPC .................................... *B60R 22/38* (2013.01)

(58) Field of Classification Search
CPC ............................... B60R 22/36; B60R 22/38
See application file for complete search history.

(56) References Cited

U.S. PATENT DOCUMENTS

| | | |
|---|---|---|
| 4,767,082 A | 8/1988 | Schmidt et al. |
| 4,948,066 A | 8/1990 | Matsumoto et al. |
| 5,518,197 A | 5/1996 | Gray |
| 6,109,556 A | 8/2000 | Kopetzky et al. |
| 6,405,963 B1 | 6/2002 | Specht et al. |
| 6,631,865 B2 | 10/2003 | Palliser |
| 6,641,077 B2 | 11/2003 | Hanna et al. |
| 7,083,135 B2 | 8/2006 | Fleischmann et al. |
| 7,384,014 B2 | 6/2008 | Ver Hoven et al. |
| 2001/0004094 A1 | 6/2001 | Hanna et al. |
| 2003/0015616 A1 | 1/2003 | Palliser |
| 2004/0065763 A1 | 4/2004 | Hanna et al. |
| 2004/0195422 A1 | 10/2004 | Fleischmann et al. |
| 2006/0055226 A1 | 3/2006 | Ver Hoven et al. |
| 2015/0224959 A1 | 8/2015 | Suminaka et al. |
| 2016/0288768 A1 * | 10/2016 | Hodatsu .................. B60R 22/40 |

FOREIGN PATENT DOCUMENTS

| | | |
|---|---|---|
| DE | 196 48 515 A1 | 5/1998 |
| DE | 199 60 554 A1 | 3/2001 |
| DE | 10 2015 101 803 A1 | 8/2015 |
| EP | 1 462 323 B1 | 6/2006 |

(Continued)

*Primary Examiner* — Sang K Kim
(74) *Attorney, Agent, or Firm* — Foley & Lardner LLP (57) ABSTRACT

A retractor and a seat belt device that can achieve miniaturization of a device by thinning a part of an automatic lock mechanism. The automatic lock mechanism includes a switching plate that is rotatably connected to the spool via a speed reduction gear, and a lever member that is operated by the switching plate. The switching plate includes a disc-shaped guide part, a first projected part disposed on a first surface of the guide part, and a second projected part disposed on a second surface of the guide part. The lever member includes a first lever in contact with the first projected part, a second lever in contact with the second projected part, and a gap disposed between the first lever and the second lever, through which the guide part can pass.

6 Claims, 6 Drawing Sheets

(56) References Cited

FOREIGN PATENT DOCUMENTS

| | | |
|---|---|---|
| EP | 1 279 575 B1 | 9/2006 |
| EP | 1 634 781 B1 | 5/2007 |
| JP | H05-062360 U | 8/1993 |
| JP | 2003-191822 A | 7/2003 |
| WO | WO 88/04245 A1 | 6/1988 |

* cited by examiner

RETRACTOR AND SEAT BELT DEVICE

CROSS-REFERENCE TO RELATED APPLICATION

This application is based upon and claims benefit of priority from the Japanese Patent Application No. 2016-066862, filed on Mar. 29, 2016, the entire contents of which are incorporated herein by reference.

TECHNICAL FIELD

The present invention relates to a retractor and a seat belt device, and in particular, relates to a retractor including an automatic lock mechanism and to a seat belt device including the retractor.

BACKGROUND ART

Vehicles such as automobiles generally are provided with seat belt devices for restraining an occupant in a seat that includes a seat portion on which the occupant sits and a backrest portion positioned back of the occupant. Such a seat belt device includes a webbing for restraining the occupant, a retractor for retracting the webbing, a guide anchor that is disposed on a vehicle body side and guides the webbing, a belt anchor for fixing the webbing to the vehicle body side, a buckle disposed on a side surface of the seat, and a tongue disposed in the webbing. The tongue is fitted into the buckle to restrain the occupant in the seat with the webbing. In such the seat belt device, a first end of the webbing is fixed to the belt anchor, and a second end of the webbing is inserted into the guide anchor to be connected to the retractor.

Such a retractor includes an emergency locking retractor (ELR), which has an emergency lock mechanism that locks a withdrawal of a webbing in an emergency such as a vehicle collision, and an automatic locking retractor (ALR), which has an automatic lock mechanism that only retracts a webbing to lock a withdrawal of a webbing in mounting a child seat or the like. As a retractor having these lock mechanisms, for example, an ELR having an ALR is mainly used as described in Japanese Unexamined Utility Model Application Publication No. H05-62360.

An automatic lock mechanism described in Japanese Unexamined Utility Model Application Publication No. H05-62360 includes a cam member that is rotated by a shaft of a spool for winding a webbing via a speed reduction mechanism, a pawl control arm that is turned in contact with a switching projection or a lock stopper that are formed on an outer circumference of the cam member, a pawl that is turnably disposed interlocking with the pawl control arm, and a ratchet wheel that is fixed to the shaft of the spool.

In such an automatic lock mechanism, in normal use, the pawl is held in a state being separated from the ratchet wheel (off-state). When all the webbing is withdrawn, the pawl control arm is turned in contact with the switching projection, and accordingly, the pawl is also turned to be switched to a state being locked to the ratchet wheel (on-state). Thereafter, the withdrawal of the webbing is locked until the pawl control arm is brought into contact with a lock stopper. Then, when a certain amount of the webbing is retracted, the pawl control arm is turned in contact with the lock stopper, and accordingly, the pawl is also turned to be switched to a state being separated from the ratchet wheel (off-state).

SUMMARY OF INVENTION

According to a retractor described in Japanese Unexamined Utility Model Application Publication No. H05-62360 described above, a cam member for switching between the on-state and the off-state of the pawl is substantially disk-shaped, a part of an outer circumference of which is formed with both the switching projection and the lock stopper. Additionally, since the cam member and the pawl control arm are rotating parts, an axial deviation may occur not a little. Therefore, considering a manufacturing tolerance and an assembling error in addition to this axial deviation, in order to ensure the contact between the cam member and the pawl control arm, it is necessary to secure a certain amount of a thickness (width in an axial direction) of the cam member and the pawl control arm.

In recent years, miniaturization of on-vehicle equipment is highly demanded, and miniaturization of a retractor is desired. However, as described above, a conventional automatic lock mechanism has a problem that thinning of the cam member is difficult.

The present invention is made in view of the above-described problem, and an object of the present invention is to provide a retractor and a seat belt device that can achieve miniaturization of a device by thinning a part of an automatic lock mechanism.

According to the present invention, there is provided a retractor including a spool for winding a webbing that strains an occupant, and an automatic lock mechanism for locking withdrawal of the webbing, wherein the automatic lock mechanism includes a switching plate that is rotatably connected to the spool via a speed reduction mechanism, and a lever member that is operated by the switching plate, the switching plate includes a disc-shaped guide part, a first projected part that is disposed on a first surface of the guide part, and a second projected part that is disposed on a second surface of the guide part, and the lever member includes a first lever that is in contact with the first projected part, a second lever that is in contact with the second projected part, and a gap that is disposed between the first lever and the second lever, through which the guide part can pass.

Additionally, according to the present invention, there is provided a seat belt device including a webbing for restraining an occupant, a retractor for retracting the webbing, a belt anchor for fixing the webbing on a vehicle body side, a buckle disposed on a side surface of the seat, and a tongue disposed in the webbing, wherein the retractor includes a spool for winding the webbing, and an automatic lock mechanism for locking withdrawal of the webbing, the automatic lock mechanism includes a switching plate that is rotatably connected to the spool via a speed reduction mechanism, and a lever member that is operated by the switching plate, the switching plate includes a disc-shaped guide part, a first projected part that is disposed on a first surface of the guide part, and a second projected part that is disposed on a second surface of the guide part, and the lever member includes a first lever that is in contact with the first projected part, a second lever that is in contact with the second projected part, and a gap that is disposed between the first lever and the second lever, through which the guide part can pass.

In the retractor and the seat belt device, the lever member may include a locking arm lockable to a part that is synchronously rotated with the spool.

Additionally, either one of the first projected part or the second projected part may be disposed at a position where the lever member is turned so as to switch to an on-state in which the locking arm is locked to a part that is synchronously rotated with the spool. Then, the other one of the first projected part and the second projected part may be disposed at a position where the lever member is turned so as to switch to an off-state in which the locking arm is separated from the part that is synchronously rotated with the spool.

Furthermore, the automatic lock mechanism may include an elastic body for temporarily holding the on-state or the off-state of the lever member.

Furthermore, the switching plate includes a first disc part that is coaxially disposed on a first surface of the guide part and has a smaller diameter than the guide part, and a second disc part that is coaxially disposed on a second surface of the guide part and has a smaller diameter than the guide part. The first projected part may be disposed on a side surface of the first disc part, and the second projected part may be disposed on a side surface of the second disc part.

Advantageous Effects of Invention

According to the retractor and the seat belt device of the present invention described above, since the guide part can guide the lever member by forming the guide part in the switching plate, it is possible to reduce influence of an axial deviation of a part, a manufacturing tolerance, an assembling error or the like, to thin the switching plate, and eventually to achieve miniaturization of a device.

BRIEF DESCRIPTION OF THE DRAWINGS

FIGS. 2(A) to 2(C) are detailed views illustrating components of an automatic lock mechanism, in which

FIGS. 3(A) and 3(B) are explanatory views illustrating an operation that switches from an off-state to an on-state of the automatic lock mechanism, in which FIG. 3(A) illustrates the off-state, and FIG. 3(B) illustrates the on-state.

FIGS. 4(A) and 4(B) are explanatory views illustrating an operation that switches from the on-state to the off-state of the automatic lock mechanism, in which FIG. 4(A) illustrates the on-state, and FIG. 4(B) illustrates the off-state.

DETAILED DESCRIPTION OF THE PREFERRED EMBODIMENTS

Figure 1:
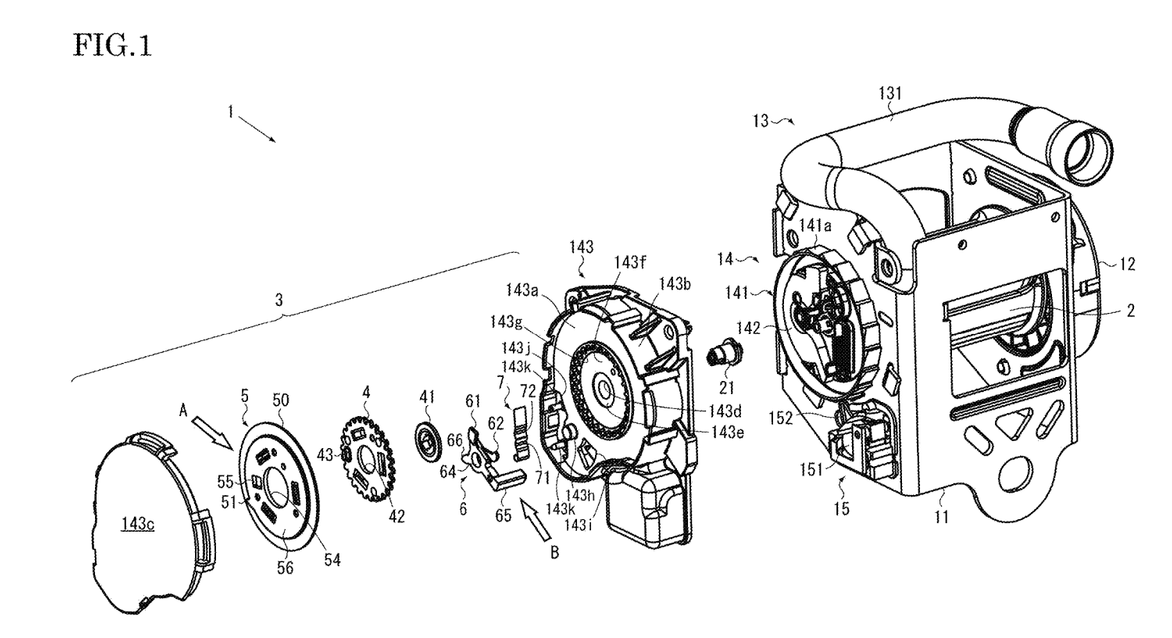
FIG. 1 illustrates a developed view of parts of a retractor according to an embodiment of the present invention.
Figure 2A:
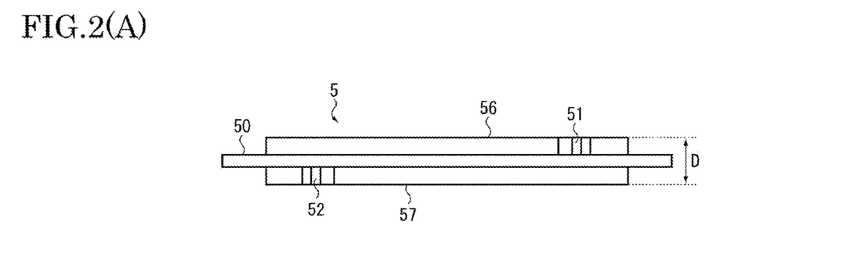
FIG. 2(A) illustrates a side view of a switching plate.
Figure 2B:
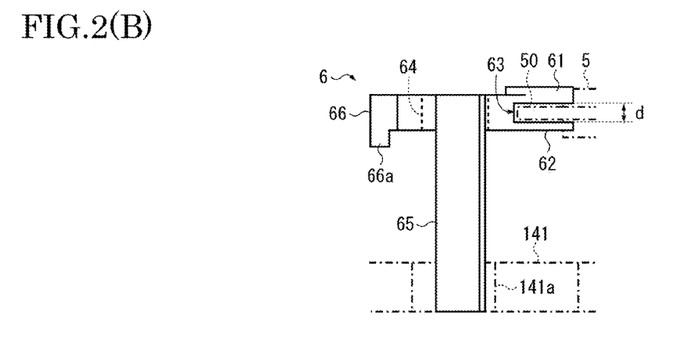
FIG. 2(B) illustrates a side view of a lever member.
Figure 2C:
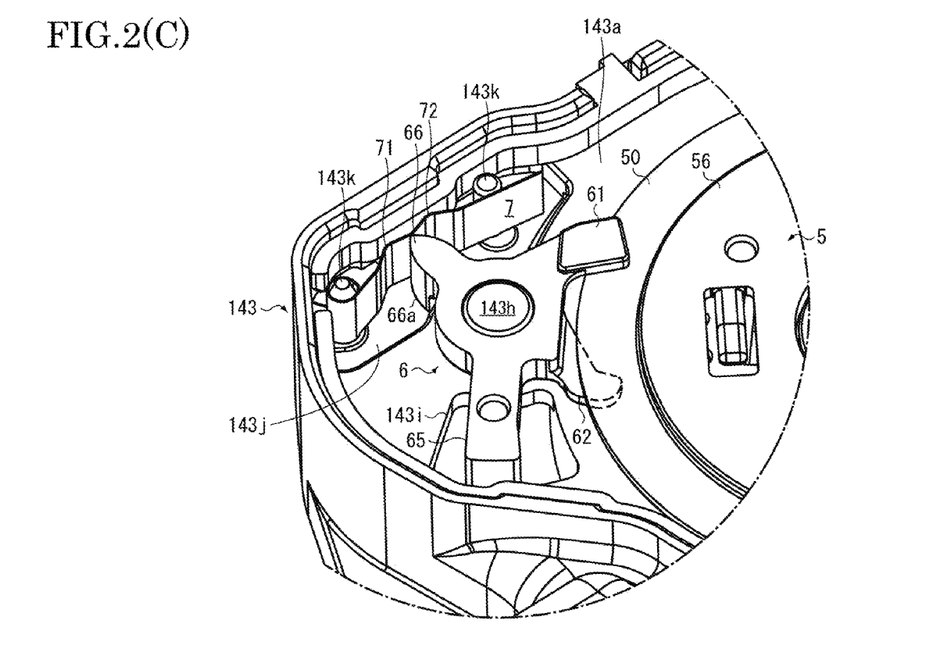
FIG. 2(C) illustrates a peripheral perspective view of the lever member.

An embodiment of the present invention is described below with reference to FIGS. 1 to 5. Here, FIG. 1 illustrates a developed view of parts of a retractor according to an embodiment of the present invention. FIGS. 2(A) to 2(C) are detailed views illustrating components of an automatic lock mechanism, in which FIG. 2(A) illustrates a side view of a switching plate, FIG. 2(B) illustrates a side view of a lever member, and FIG. 2(C) illustrates a peripheral perspective view of the lever member. It should be noted that an illustration of the webbing is omitted from FIG. 1. Additionally, FIG. 2(A) is the side view viewed from the A-arrow direction in FIG. 1, and FIG. 2(B) is the side view viewed from the B-arrow direction in FIG. 1.

The retractor 1 according to an embodiment of the present invention includes, as illustrated in FIGS. 1 to 2(C), for example, a spool 2 for winding a webbing that restrains an occupant, and an automatic lock mechanism 3 for locking withdrawal of the webbing. The automatic lock mechanism 3 includes a switching plate 5 that is rotatably connected to the spool 2 via a speed reduction gear 4, and a lever member 6 that is operated by the switching plate 5. The switching plate 5 includes a disc-shaped guide part 50, a first projected part 51 that is disposed on a first surface of the guide part 50, and a second projected part 52 that is disposed on a second surface of the guide part 50. The lever member 6 includes a first lever 61 that is in contact with the first projected part 51, a second lever 62 that is in contact with the second projected part 52, and a gap 63 that is disposed between the first lever 61 and the second lever 62, through which the guide part 50 can pass.

The spool 2 is a retracting drum that retracts the webbing and is rotatably contained in a base frame 11 that forms a skeleton of the retractor 1. The base frame 11 is, for example, in a substantially square cylindrical shape. On a first end surface of the base frame 11 (e.g., right side in the figure), a spring unit 12 is disposed, and on a second end surface of the base frame 11 (e.g., left side in the figure), components such as a pretensioner 13, an emergency lock mechanism 14, and a vehicle sensor 15 are disposed. It should be noted that, for convenience of description, for the spring unit 12, the pretensioner 13, and the emergency lock mechanism 14, only a part of the components are illustrated in FIG. 1. Additionally, dispositions of the spring unit 12, the pretensioner 13, the emergency lock mechanism 14 and the like are not limited to an illustrated structure.

The spring unit 12 includes a power spring that is connected to a shaft of the spool 2, and the power spring energizes the webbing in a retracting direction. The pretensioner 13 is a part for rotating a drive wheel that is connected to a shaft of the spool 2, and eliminating slack in the webbing in an emergency such as a vehicle collision. The pretensioner 13 includes a power transmission unit for transmitting power to the drive wheel. The power transmission unit includes, for example, a power transmission member for rotationally driving the drive wheel, a pipe 131 that contains the power transmission member and ejects the power transmission member in an emergency, a gas generator for supplying gas into the pipe 131 in an emergency, and the like.

The emergency lock mechanism 14 is a part for locking withdrawal of the webbing according to an acceleration speed of withdrawal of the webbing in an emergency such as a vehicle collision. The emergency lock mechanism 14 includes, for example, the locking base disposed at an end of a shaft of the spool 2, the pawl disposed to the locking base movably in a radial direction, a lock gear 141 that is rotatably disposed at the locking base and has external teeth 141a on an outer circumference, a flywheel 142 swingably disposed to the lock gear 141, and a retainer cover 143 that contains these parts and rotatably supports the locking base. It should be noted that the emergency lock mechanism 14 is not limited to that with the structure illustrated, but those with various structures which conventionally exist may be optionally selected and used.

The vehicle sensor 15 is a part for detecting sudden deceleration of a vehicle body. The vehicle sensor 15 includes, for example, a spherical mass body 151 and a sensor lever 152 that is swung by a movement of the mass body 151. A tip of the sensor lever 152 is structured so as to be lockable to the external teeth 141a of the lock gear 141.

According to the emergency lock mechanism 14 described above, when the webbing is faster than a normal speed of withdrawal, namely, acceleration speed of withdrawal of the webbing exceeds a specified threshold value, the flywheel 142 swings and engages with internal teeth of the retainer cover 143, and rotation of the lock gear 141 is regulated. Additionally, when the vehicle sensor 15 is actuated, the sensor lever 152 is locked to the external teeth 141a of the lock gear 141, and the rotation of the lock gear 141 is regulated.

When the rotation of the lock gear 141 is regulated, the locking base and the lock gear 141 are rotated relative to each other, and the pawl moves radially outward along with this relative rotation so that a tip of the pawl is locked to internal teeth that are formed in an opening of the base frame 11. As a result, the rotation of the locking base is regulated and rotation of the spool 2 is also regulated. Thus, the withdrawal of the webbing is locked.

It should be noted that, at normal time (when the acceleration speed of withdrawal of the webbing is equal to or less than the specified threshold value), the emergency lock mechanism 14 is not actuated, and the locking base and the lock gear 141 are rotated together along with the rotation of the spool 2. Thus, since the locking base and the lock gear 141 are not rotated relative to each other at the normal time, the pawl is maintained in a state of being retracted to a position where the pawl does not interfere with the internal teeth that are formed in the opening of the base frame 11.

The automatic lock mechanism 3 according to the embodiment is disposed outside in the axial direction of the emergency lock mechanism 14. Specifically, the automatic lock mechanism 3 is, for example, disposed in a containing space that is formed of an outer surface 143a of the retainer cover 143, a wall member 143b disposed on the outer surface 143a, and a lid member 143c fixed to the wall member 143b. Additionally, the outer surface 143a is formed with an opening 143d that is inserted with a bearing cap 21 disposed at a shaft end part of the spool 2, a first concaved part 143e that contains an eccentric cam 41 connected to the bearing cap 21, a second concaved part 143f that contains a speed reduction gear 4, and the like.

The speed reduction gear 4 is a part that is included in a speed reduction mechanism for reducing a rotation speed of the spool 2 to transmit power to the switching plate 5. The speed reduction gear 4 is rotatably supported by the eccentric cam 41 that includes an eccentric shaft (not shown) that is eccentric to a rotating shaft of the spool 2. The speed reduction gear 4 includes an opening 42 that is inserted with the eccentric shaft in a center, and a projecting part 43 that is formed on a surface at a side disposed with the switching plate 5 and is locked to the switching plate 5. Additionally, a side surface portion of the second concaved part 143f of the retainer cover 143 is formed with internal teeth 143g lockable to the speed reduction gear 4.

Therefore, the speed reduction gear 4 is disposed with a part of a teeth part locked to the internal teeth 143g, and revolves while rotating around the rotating shaft of the spool 2 along the internal teeth 143g with the rotation of the spool 2. In this case, while the projecting part 43 is at a position distant from the rotating shaft of the spool 2 in a state that the teeth part at a portion close to the projecting part 43 are locked to the internal teeth 143g, the projecting part 43 is at a position close to the rotating shaft of the spool 2 in a state that the teeth part at a portion distant from the projecting part 43 are locked to the internal teeth 143g. In other words, the projecting part 43 moves in a radial direction according to the rotation of the speed reduction gear 4.

The above-described speed reduction mechanism uses a so-called hypocycloid speed reduction device using an inscribed speed reduction gear 4. A structure of such a speed reduction mechanism is described in detail, for example, in Japanese Unexamined Patent Application No. 2001-213275. It should be noted that the speed reduction mechanism is not limited to that with the structure illustrated. If a speed can be reduced between the spool 2 and the switching plate 5, it may be a speed reduction mechanism using other devices (e.g., a planetary gear device, a magical planetary gear device, a wave gear device, a pin gear device and the like).

The switching plate 5 is a part for switching between an on-state and an off-state of the lever member 6. The switching plate 5 includes an opening 54 that is inserted with an outer edge of the eccentric cam 41 in a center. The outer edge of the eccentric cam 41 is in a circular shape that is formed coaxially with the rotating shaft of the spool 2, and the switching plate 5 is disposed rotatably and coaxially with respect to the rotating shaft of the spool 2. Additionally, the switching plate 5 includes an opening 55 that is locked to the projecting part 43 of the speed reduction gear 4. The opening 55 has a radial width that allows a radial movement of the projecting part 43, and rotates the switching plate 5 along with a movement in a circumferential direction of the projecting part 43.

The switching plate 5 includes, for example, as illustrated in FIG. 2(A), a first disc part 56 that is coaxially disposed on a first surface (e.g., upper side in the figure) of the guide part 50 and has a smaller diameter than the guide part 50, and a second disc part 57 that is coaxially disposed on a second surface (e.g., lower side in the figure) of the guide part 50 and has a smaller diameter than the guide part 50. In other words, the guide part 50 is formed in a disc shape that has a larger diameter than the first disc part 56 and the second disc part 57. It should be noted that the first disc part 56 and the second disc part 57 may have diameters in a same size, and may have diameters in different sizes.

Then, the first projected part 51 is disposed on a side surface of the first disc part 56, and the second projected part 52 is disposed on a side surface of the second disc part 57. In this case, the first projected part 51 and the second projected part 52 are disposed so as not to outwardly extrude in a radial direction from the guide part 50. Additionally, as illustrated in FIG. 2(A), the first projected part 51 and the second projected part 52 are disposed in positions of different phases to a rotation direction according to functions thereof.

It should be noted that the first projected part 51 and the second projected part 52 are not limited to those with the structure in which the first projected part 51 and the second projected part 52 are disposed in the first disc part 56 and the second disc part 57. The first projected part 51 and the second projected part 52 may be disposed directly on a front surface or a rear surface of the guide part 50 by omitting the first disc part 56 and the second disc part 57.

The lever member 6 is a part that is turned by the first projected part 51 and the second projected part 52 of the switching plate 5 at different timings. Specifically, as illustrated in FIGS. 1 and 2(B), the lever member 6 includes, for example, an opening 64 that is inserted with a shaft portion 143h formed on the outer surface 143a of the retainer cover 143, a first lever 61 in contact with the first projected part 51, a second lever 62 in contact with the second projected part 52, a gap 63 that is disposed between the first lever 61 and the second lever 62, through which the guide part 50 can pass, a locking arm 65 lockable to a part (e.g., lock gear 141) that is synchronously rotated with the spool 2, and a supporting part 66 that abuts against an elastic body 7 disposed on the outer surface 143a of the retainer cover 143.

The first lever 61 and the second lever 62 are, as illustrated in FIG. 2(B), formed at different height positions in an axial direction, and a gap 63 having a width d is formed in an axial direction of the first lever 61 and the second lever 62. This gap 63 has the larger width d than a thickness of the guide part 50 of the switching plate 5 such that the guide part 50 can pass through. Since the first lever 61 and the second lever 62 are required to be in contact with the first projected part 51 and the second projected part 52 that are positioned further radially inside than an outer edge part of the guide part 50, the first lever 61 and the second lever 62 are formed so as to extend further radially inside than the outer edge part of the guide part 50.

Thus, the guide part 50 of the switching plate 5 is passed through the gap 63 of the lever member 6, which enables the guide part 50 to regulate a movement of the lever member 6 in an axial direction, and enables a more secure contact than before between the first lever 61 and the first projected part 51, and between the second lever 62 and the second projected part 52. Therefore, a thickness D of the switching plate 5 illustrated in FIG. 2(A) can be set to be smaller than a conventional one.

It should be noted that, as illustrated in FIGS. 1 and 2(C), the first lever 61 and the second lever 62 may be formed at a position of a different phase with respect to a rotation direction of the lever member 6, or may be formed at a position of a same phase with respect to the rotation direction of the lever member 6. Additionally, the first lever 61 and the second lever 62 may be formed to be partially thick according to required strength.

The locking arm 65 is, as illustrated in FIGS. 1 and 2(B), formed so as to extend in a direction parallel to an axial direction of a turning shaft of the lever member 6. Additionally, the locking arm 65 has an axial length to be lockable with the external teeth 141a of the lock gear 141. It should be noted that, on the outer surface 143a of the retainer cover 143, there is formed an opening 143i through which the locking arm 65 is inserted. The opening 143i is formed in a size not to inhibit the turn of the locking arm 65.

As illustrated in FIG. 2(C), the supporting part 66 is a portion that abuts against the elastic body 7 and is energized so as to hold an attitude of the lever member 6 (the on-state or the off-state). The elastic body 7 is, for example, structured by a plate spring that includes a recess 71 that holds the on-state, and a recess 72 that holds the off-state. In a stationary state in which the lever member 6 is not turned, the supporting part 66 is fitted into either of the recess 71 or the recess 72 to hold the attitude of the lever member 6. Additionally, when the lever member 6 is turned in contact with the switching plate 5, the rotational force thereof elastically deforms the elastic body 7, and the supporting part 66 moves from the recess 71 to the recess 72, or from the recess 72 to the recess 71, to be held.

In other words, the automatic lock mechanism 3 according to the embodiment includes the elastic body 7 that temporarily holds the on-state or the off-state of the lever member 6. It should be noted that the outer surface 143a of the retainer cover 143 is formed with a concaved part 143j that contains the elastic body 7, and the concaved part 143j is disposed with a plurality of support pins 143k for positioning the elastic body 7. Additionally, a tip of the supporting part 66 may have a hook part 66a that is inserted into the concaved part 143j. By forming the hook part 66a, the concaved part 143j can also be used as a guide groove for guiding a movement of the supporting part 66.

It should be noted that, such the elastic body 7 and the support structure thereof are not limited to the illustrated structure. For example, the elastic body 7 may be an elastic body such as rubber, or may be a projection that is elastically deformed due to the rotational force of the lever member 6. Additionally, as required, the hook part 66a of the supporting part 66 may be omitted, and the concaved part 143j formed on the outer surface 143a of the retainer cover 143 may be omitted.

In the embodiment described above, the first projected part 51 and the first lever 61 form a switch for switching the lever member 6 to the on-state, the second projected part 52 and the second lever 62 form a switch for switching the lever member 6 to the off-state. In other words, while the first projected part 51 is disposed at a position where the lever member 6 is turned so as to switch to the on-state in which the locking arm 65 is locked to a part (lock gear 141) that is synchronously rotated with the spool 2, the second projected part 52 is disposed at a position where the lever member 6 is turned so as to switch to the off-state in which the locking arm 65 is separated from the part (lock gear 141) that is synchronously rotated with the spool 2.

Although not illustrated, the first projected part 51 and the first lever 61 may form a switch for switching the lever member 6 to the off-state, and the second projected part 52 and the second lever 62 may form a switch for switching the lever member 6 to the on-state. Additionally, although the locking arm 65 is locked to the lock gear 141 in this embodiment, the locking arm 65 may be locked to another part (e.g., a new part not included in the locking base or the emergency lock mechanism 14, or the like), as long as the part is synchronously rotated with the spool 2.

Figure 3A:
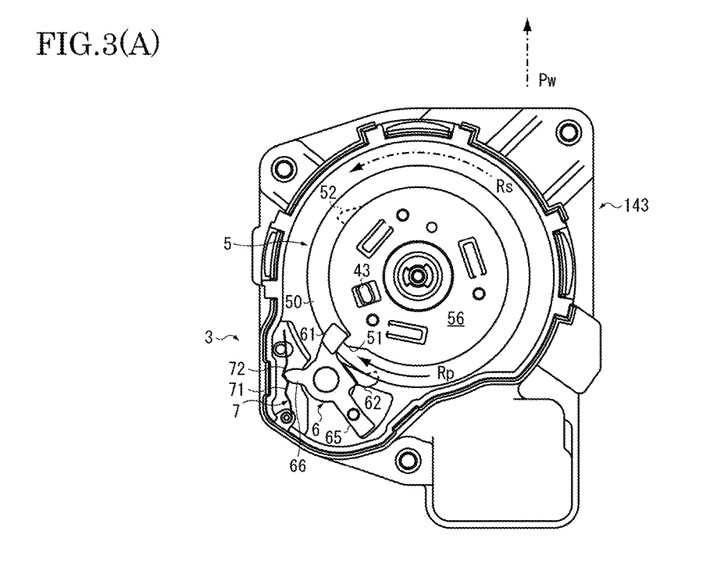
Figure 3B:
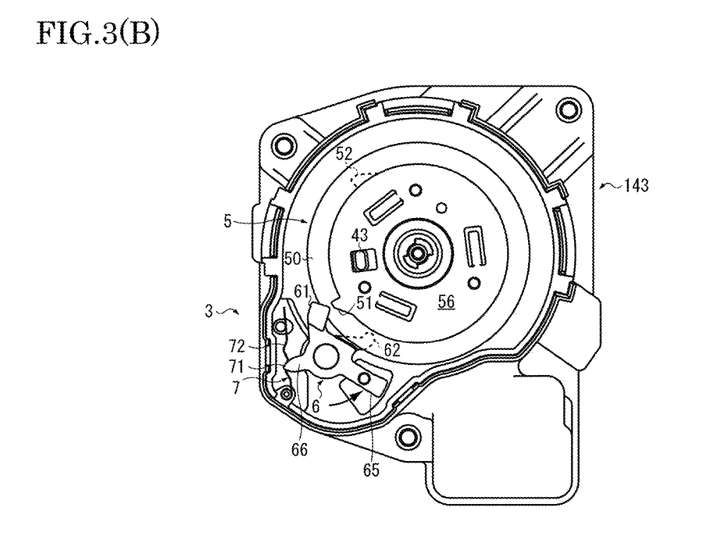
Figure 4A:
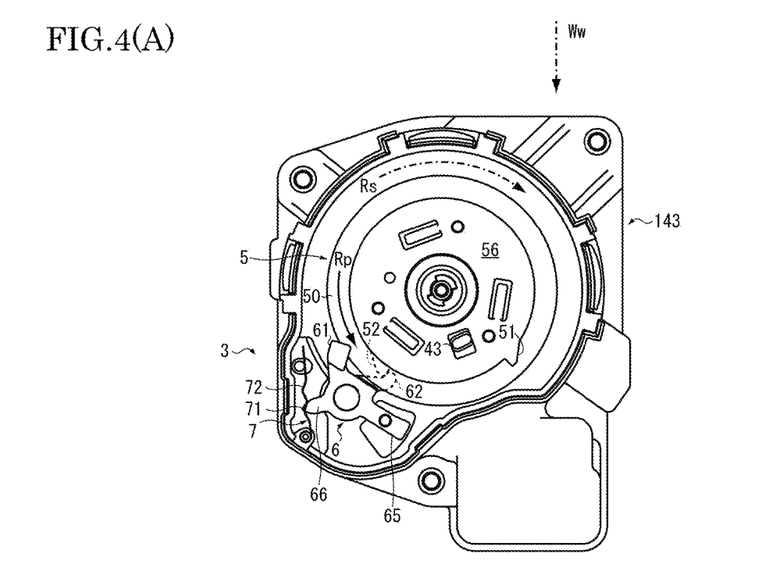
Figure 4B:
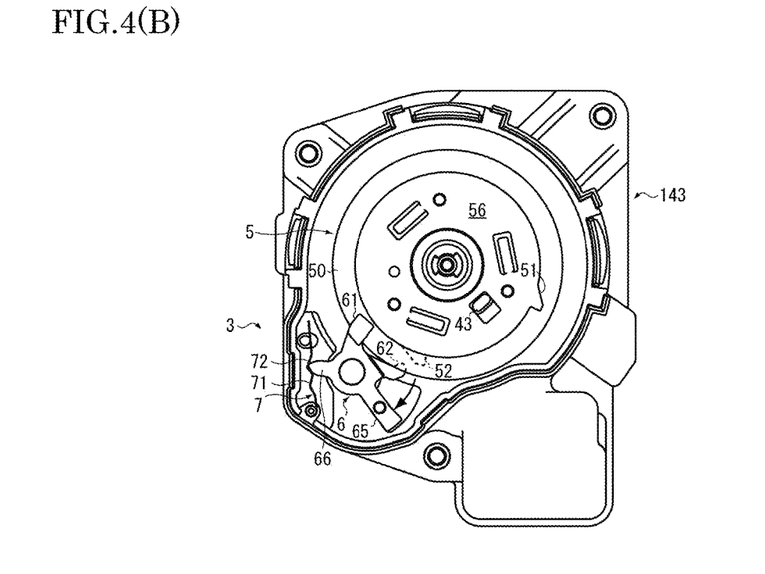

Next, operations of the automatic lock mechanism 3 are described with reference to FIGS. 3(A) to 4(B). Here, FIGS. 3(A) and 3(B) are explanatory views illustrating an operation that switches from an off-state to an on-state of the automatic lock mechanism, in which FIG. 3(A) illustrates the off-state, and FIG. 3(B) illustrates the on-state. FIGS. 4(A) and 4(B) are explanatory views illustrating an operation that switches from the on-state to the off-state of the automatic lock mechanism, in which FIG. 4(A) illustrates the on-state, and FIG. 4(B) illustrates the off-state.

First, the operation that switches from the off-state to the on-state of the automatic lock mechanism 3 is described. In the off-state in which the automatic lock mechanism 3 is not actuated, as illustrated in FIG. 3(A), the locking arm 65 of the lever member 6 is at a retreat position that is separated from the external teeth 141a of the lock gear 141. In this case, the first lever 61 of the lever member 6 is at a position contactable with the first projected part 51. Additionally, in such the off-state, the supporting part 66 of the lever member 6 is fitted into the recess 72 of the elastic body 7, and the lever member 6 is positioned at the off-state.

In order to switch the automatic lock mechanism 3 to the on-state, for example, all the webbing is withdrawn to rotate the switching plate 5, and the first projected part 51 is brought into contact with the first lever 61. For example, as illustrated in FIG. 3(A), when the webbing is withdrawn in a Pw-direction (upper direction in the figure), the spool 2 is rotated in an Rs-direction (counterclockwise direction in the figure), a speed of the switching plate 5 is reduced by an action of the speed reduction gear 4, and the switching plate 5 is rotated in an Rp-direction (clockwise direction in the figure). Then, as illustrated in FIG. 3(A), immediately before all the webbing is withdrawn, the first projected part 51 comes into contact with the first lever 61.

Further, when the webbing is withdrawn in the Pw-direction to withdraw all the webbing, as illustrated in FIG. 3(B), the first projected part 51 is further rotated in the clockwise direction and presses the first lever 61 to rotate the lever member 6 in the counterclockwise direction. In this case, the supporting part 66 moves from the recess 72 to the recess 71, while elastically deforming the elastic body 7 with the rotational force of the lever member 6. When the rotation of the lever member 6 is finished, the supporting part 66 remains in the recess 71 due to an elastic force of the elastic body 7 to hold the attitude of the lever member 6.

A turn of such the lever member 6 switches the locking arm 65 to the on-state in which the locking arm 65 is locked to the external teeth 141a of the lock gear 141. When the locking arm 65 is locked to the external teeth 141a of the lock gear 141, rotation of the lock gear 141 in a withdrawal direction of the webbing (counterclockwise direction in the figure) is regulated, and the withdrawal of the webbing is locked. On the other hand, even in a state in which the locking arm 65 is locked to the external teeth 141a of the lock gear 141, the lock gear 141 can rotate in a retracting direction of the webbing (clockwise direction in the figure), and can retract the webbing.

Thus, when the lever member 6 is switched to the on-state, the first lever 61 moves to a position not in contact with the first projected part 51, and the second lever 62 moves to a position contactable with the second projected part 52, due to the turn of the lever member 6.

Next, the operation that switches the automatic lock mechanism 3 from the on-state to the off-state is described. In the on-state in which the automatic lock mechanism 3 is actuated, as illustrated in FIG. 4(A), the locking arm 65 of the lever member 6 is in a position locked to the external teeth 141a of the lock gear 141. In this case, the second lever 62 of the lever member 6 is at a position contactable with the second projected part 52. Additionally, in such the on-state, the supporting part 66 of the lever member 6 is fitted into the recess 71 of the elastic body 7, and the lever member 6 is positioned at the on-state.

In order to switch the automatic lock mechanism 3 to the off-state, for example, only a predetermined amount of the webbing is retracted to rotate the switching plate 5, and the second projected part 52 is brought into contact with the second lever 62. For example, as illustrated in FIG. 4(A), when the webbing is retracted in a Ww-direction (lower direction in the figure), the spool 2 is rotated in an Rs-direction (clockwise direction in the figure), a speed of the switching plate 5 is reduced by an action of the speed reduction gear 4, and the switching plate 5 is rotated in an Rp-direction (counterclockwise direction in the figure). Then, as illustrated in FIG. 4(A), immediately before the predetermined amount of the webbing is retracted, the second projected part 52 comes into contact with the second lever 62.

Further, when the webbing is retracted in the Ww-direction, as illustrated in FIG. 4(B), the second projected part 52 is further rotated in the counterclockwise direction and presses the second lever 62 to rotate the lever member 6 in the clockwise direction. In this case, the supporting part 66 moves from the recess 71 to the recess 72, while elastically deforming the elastic body 7 with the rotational force of the lever member 6. When the rotation of the lever member 6 is finished, the supporting part 66 remains in the recess 72 due to the elastic force of the elastic body 7 to hold the attitude of the lever member 6.

The turn of such the lever member 6 switches the locking arm 65 to the off-state in which the locking arm 65 is separated from the external teeth 141a of the lock gear 141, namely, where a locked state is released. When the locking arm 65 is separated from the external teeth 141a of the lock gear 141, the rotational regulation of the lock gear 141 in the withdrawal direction of the webbing (counterclockwise direction in the figure) is released to enable the webbing to be withdrawn. In this case, the lock gear 141 can also rotate in the retracting direction of the webbing (clockwise direction in the figure), and can also retract the webbing.

Thus, when the lever member 6 is switched to the off-state, the second lever 62 moves to a position not in contact with the second projected part 52, and the first lever 61 moves to a position contactable with the first projected part 51, due to the turn of the lever member 6.

According to the retractor 1 of the embodiment described above, since the guide part 50 can guide the lever member 6 by forming the guide part 50 in the switching plate 5, it is possible to reduce influence of an axial deviation of a part, a manufacturing tolerance, an assembling error or the like, to thin the switching plate 5, and eventually to achieve miniaturization of a device (the retractor 1).

Figure 5:
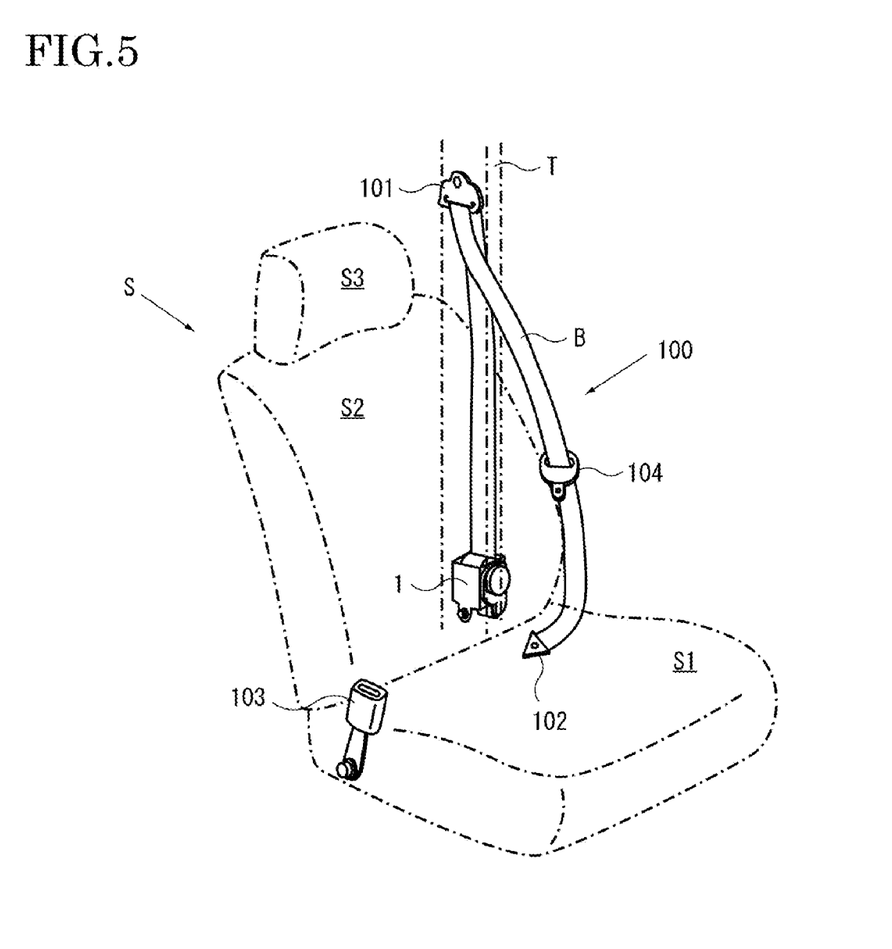
FIG. 5 illustrates an overall structure of a seat belt device according to an embodiment of the present invention.

Next, a seat belt device according to the embodiment of the present invention is described below with reference to FIG. 5. Here, FIG. 5 illustrates an overall structure of the seat belt device according to the embodiment of the present invention. It should be noted that, for convenience of description, parts other than the seat belt device are indicated by dotted-chain lines in FIG. 5.

A seat belt device 100 according to the embodiment illustrated in FIG. 5 includes a webbing B for restraining an occupant, a retractor 1 for retracting the webbing B, a guide anchor 101 that is disposed on a vehicle body side and guides the webbing B, a belt anchor 102 for fixing the webbing B to the vehicle body side, a buckle 103 that is disposed on a side surface of a seat S, and a tongue 104 that is disposed in the webbing B. The retractor 1 has, for example, the structure illustrated in FIG. 1.

Components other than the retractor 1 are briefly described below. The seat S includes, for example, a seat portion S1 on which the occupant sits, a backrest portion S2 that is positioned back of the occupant, and a headrest portion S3 for supporting the head of the occupant. The retractor 1 is disposed, for example, in a B-pillar T of the vehicle body. In general, the buckle 103 is often disposed on a side surface of the seat portion S1, and the belt anchor 102 is often disposed on a lower surface of the seat portion S1. Furthermore, the guide anchor 101 is often disposed at the B-pillar T. Then, a first end of the webbing B is connected to the belt anchor 102, and a second end of the webbing B is connected to the retractor 1 via the guide anchor 101.

Accordingly, in order to fit the tongue 104 into the buckle 103, the webbing B is withdrawn from the retractor 1 while being slid through an insertion hole of the guide anchor 101. Furthermore, when the occupant fastens the seat belt or releases the seat belt to leave the vehicle, the webbing B is retracted due to an action of the spring unit 12 of the retractor 1 until a certain amount of load is applied to the webbing B.

The above-described seat belt device 100 is made by applying the retractor 1 according to the embodiment described above to a typical seat belt device for a front seat. The retractor 1 includes an automatic lock mechanism 3 according to the embodiment described above. Therefore, according to the seat belt device 100 of the embodiment, miniaturization of the retractor 1 can be achieved by thinning the switching plate 5.

The present invention is not limited to the above-described embodiment. Of course, the present invention can be changed in various manners without departing from the gist of the invention. For example, the invention may be applied to a seat belt device used for a rear seat of a vehicle, and the invention may be applied to a seat belt device used for a conveyance other than the vehicle.

What is claimed is:

1. A retractor comprising:
a spool for winding a webbing that restrains an occupant; and
an automatic lock mechanism for locking withdrawal of the webbing, wherein
the automatic lock mechanism comprises a switching plate that is rotatably connected to the spool via a speed reduction mechanism, and a lever member that is operated by the switching plate,
the switching plate comprises a disc-shaped guide part, a first projected part that is disposed on a first surface of the guide part, and a second projected part that is disposed on a second surface of the guide part, and
the lever member comprises a first lever that is in contact with the first projected part, a second lever that is in contact with the second projected part, and a gap that is disposed between the first lever and the second lever, wherein the guide part can pass through the gap.

2. The retractor according to claim 1, wherein the lever member comprises a locking arm lockable to a part that is synchronously rotated with the spool.

3. The retractor according to claim 2, wherein either one of the first projected part or the second projected part is disposed at a position wherein the lever member is turned so as to switch to an on-state wherein the locking arm is locked to a part that is synchronously rotated with the spool, and another one of the first projected part and the second projected part is disposed at a position wherein the lever member is turned so as to switch to an off-state wherein the locking arm is separated from the part that is synchronously rotated with the spool.

4. The retractor according to claim 3, wherein the automatic lock mechanism includes an elastic body for temporarily holding the on-state or the off-state of the lever member.

5. The retractor according to claim 1, wherein the switching plate includes a first disc part that is coaxially disposed on a first surface of the guide part and has a smaller diameter than the guide part, a second disc part that is coaxially disposed on a second surface of the guide part and has a smaller diameter than the guide part, wherein the first projected part is disposed on a side surface of the first disc part, and the second projected part is disposed on a side surface of the second disc part.

6. A seat belt device comprising:
a webbing for restraining an occupant;
a retractor for retracting the webbing;
a belt anchor for fixing the webbing on a vehicle body side;
a buckle disposed on a side surface of the seat; and
a tongue disposed in the webbing, wherein
the retractor is the retractor according to claim 1.

* * * * *